UNITED STATES PATENT OFFICE.

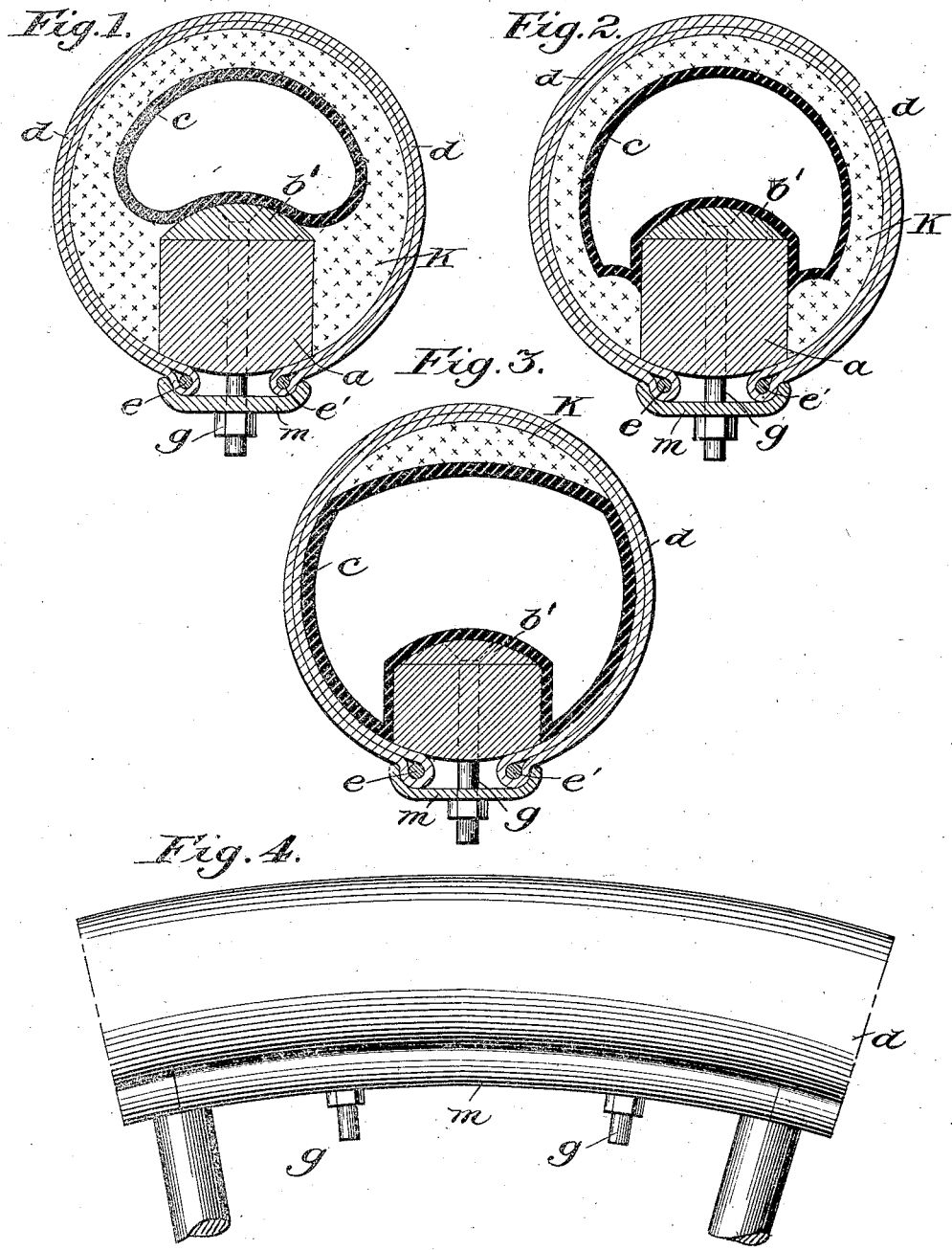

HARRY G. OSBURN, OF HOBOKEN, NEW JERSEY.

RUBBER WHEEL-TIRE.

No. 827,938. Specification of Letters Patent. Patented Aug. 7, 1906.

Application filed August 17, 1900. Serial No. 27,139.

*To all whom it may concern:*

Be it known that I, HARRY G. OSBURN, a citizen of the United States, residing at Hoboken, in the county of Hudson and State of New Jersey, have invented a certain new and useful Improvement in Rubber Wheel-Tires, of which the following is a full, clear, concise, and exact description, reference being had to the accompanying drawings, forming a part of this specification.

My invention relates to a rubber tire for vehicle-wheels, my object being to provide a form of tire which will obviate the objections incident to such tires as commonly employed in practice.

It has been a common practice in the construction of wheel-tires heretofore to employ upon the periphery of the felly of the wheel a channel-bar having outwardly-flaring flanges between which the base of the pneumatic tire is secured. When the tire is punctured or for other reason becomes deflated, the rubber tire rests against the sharp edges of the flanges, and as the wheel travels over the roadway the flanges thus cut and mutilate the tire. Moreover, the flanges are themselves bent and injured by contact with the rough roadway.

It is one object of the present invention to provide a construction of wheel-tire such that when for any reason the tire becomes deflated the same will not be injured when the vehicle is operated. In accordance with this feature of my invention I provide the periphery of the felly of the wheel with a smooth and even surface, so that when the tire becomes deflated the flexible parts thereof may rest against the smooth surface and the injury to the tire thus avoided. In order that there may be no solid portions of the wheel to project beyond the periphery to thereby become deranged and injured, I provide all of the connecting devices for securing the tire in position wholly within the outer periphery of the felly of the wheel. By the term "felly" as employed in the claims appended hereto I contemplate the solid portions of the wheel as the wooden and metallic parts comprising the rim of the wheel as distinguished from the rubber or flexible parts which constitute the tire.

With the tire of my invention the rubber parts may be readily removed when desired, leaving the wheel to be run as an ordinary wheel. Thus if the tire becomes punctured or deflated instead of running the vehicle with the deflated tire the rubber tire may be entirely removed. When the tire of a wheel on one side of the vehicle becomes deflated, the running of the vehicle would in many cases be objectionable, since one wheel would thus be of less diameter than the other. Accordingly the tires of both wheels may be removed and both wheels used without the tires, the fastening devices for the tires lending themselves to the ready removal of the tires. The tires can be again placed in position without difficulty.

In tires of the class in which a channel-bar is provided within which the tire fits special tools are necessary to stretch the tire to pass the same over the edge of the flange of the bar. In the present invention the tube fits around a smooth felly having no projecting flanges or parts necessitating the stretching of the tube or tire. In very large tires the structure becomes unyielding on account of the mass of rubber employed and the stretching of these large tires to pass the same over the flange becomes very difficult. With my construction large tires may be passed into position without stretching the tire.

When the channel-bar is employed for holding the tire, the greatest wear comes upon the tire where the same engages the edges of the flanges of the bar, and the tire is in time cut or worn away at this point. By doing away with the flanges entirely I avoid this objection. The covering of the tire instead of bending about any sharp edge when the tire is compresssed merely rocks, as it were, upon the fastening-wires as pivots and the cutting tendency is thus entirely removed. Moreover, in order to reduce the cutting or wearing effect to a minimum the tire must be kept as tightly inflated as possible, thereby impairing the yieldingness of the wheel and the smoothness of running. In my tire the tire may be used as tightly blown as desired without injury thereto from cutting, since there are no sharp flanges against which the tube can rest.

Where the wheel is used as the driving-wheel of a self-propelled vehicle, there is great tendency of the tire to creep, and it has been necessary to provide lugs to limit the movement of the tire relatively to the wheel. In my structure since the edges of the tire-covering are clamped all round the periphery the tire is securely held against creeping.

In tires as heretofore constructed the tube which is inflated is usually formed of circular cross-section, and the lower portion of this tube is adapted to fit within the seat formed between the upwardly-extending flanges provided upon the tires. While the weight which a tire will carry or sustain depends upon the cross-sectional area of the tire, it has been found that the resiliency of the tire depends practically upon the area of the cross-section which is above the chord drawn through the upper edges of the flanges, this being the portion of the tire which can readily yield, while that portion of the tire which fits within the seat and is situated below the chord passing through the upper edges of the flanges is held more or less rigidly in position and is thus incapable of yielding under pressure to thereby lend resiliency to the tire. Since the rubber of a tire will stand a definite pressure, it is necessary when an increased weight is to be supported by the tire to increase the cross-section of the tire, thereby permitting the employment of a larger body of air to accommodate the increased weight. It is thus apparent that the most efficient and economical form of tire will be that in which the greatest amount of cross-sectional area of the tire is situated above the seat or support of the tire and in which the tire possesses the largest possible cross-sectional area for the given amount of rubber employed in its construction. In accordance with the present invention instead of forming the inflatable tube with circular cross-section I cut away the inner segment of the cross-section which usually rests in the seat, leaving the portion of the tire which rests against the seat flattened, whereby the cross-section presents the appearance of a partial circumference and the chord of the removed segment. The rubber which is thus saved may be put into the tire to provide an increased cross-section, or, if omitted, the tire may be formed with less rubber. Since a tire as thus constructed has practically the same effective depth above the seat as a circular tire, the resiliency is not materially impaired. I am thus enabled to provide a tire of equal resiliency by the employment of a less quantity of rubber or to provide a tire of greater cross-section, and consequently greater sustaining power and resiliency, with the same quantity of rubber.

A further and specific feature of the present invention is the employment of a tire, either pneumatic or of solid rubber, wherein the felly of the wheel is located wholly within the tire, whereby the felly is wholly or almost completely hid from view within the tire. This arrangement affords a neat appearance and a substantial structure. I do not limit my invention, however, in all its forms to the employment of this feature.

I have illustrated my invention in the accompanying drawings, in which—

Figure 1 is a cross-section of the device of my invention. Figs. 2 and 3 are sectional views of modifications of the device of my invention, and Fig. 4 is a side view of the device of my invention.

In Fig. 1 I have shown a felly $a$, provided with a periphery or band $b'$, having a convex exterior. The rubber tire $c$ is adapted to rest upon this band and is contained within a casing $d$. This casing may be made of canvas or any other suitable material and preferably consists of a double layer, formed from one piece, and is held upon the felly by means of wires $e\ e'$. These wires are held in place by means of the plate $m$. The plate $m$ and the band $b'$ are fastened to the felly by means of bolts $g$. A mass of felt $k$ is interposed between the tire $c$ and the casing $d$, which give a firm body to the tire and renders it puncture-proof.

Fig. 2 shows a modification of my invention, in which the tire $c$ is made larger and fitted about the felly and the amount of felt correspondingly altered.

Fig. 3 shows another modification of my invention, in which the ordinary form of puncture-proof tire, which has a small amount of felt or other material between the casing and the tire at the point of contact with the ground, is used. The felly is on the inside of the tire and the casings secured in the same manner as in Figs. 1 and 2.

Having described my invention, what I claim as new, and desire to secure by Letters Patent, is—

1. In a wheel, the combination with a rim, comprising a felly having a metallic tire thereon, of a tire inclosing said rim said rim projecting into said tire and having its tread and sides cushioned thereby, and means for securing said tire to said rim.

2. In a wheel, the combination with a rim, comprising a felly having a metallic tire thereon, of a flexible tire inclosing said rim, and means for securing said flexible tire to the inner periphery of said rim, said rim projecting into said tire and having its tread and sides cushioned thereby.

3. In a wheel, the combination with a rim, comprising a felly, having a metallic tire thereon, of a flexible tire inclosing said rim, and a plurality of plates securing the tire upon the inner periphery of said rim, said rim projecting into said tire and having its tread and sides cushioned thereby.

4. In a wheel, the combination with a rim comprising a felly having a metallic tire thereon, of a tube surrounding the periphery of said felly, a casing surrounding said tube and extending to the inner periphery of the felly, means for securing said casing to said felly, and a packing arranged between said tube and said casing and extending over the edges of said felly and embracing the sides thereof.

In witness whereof I have hereunto subscribed my name in the presence of two witnesses.

HARRY G. OSBURN.

Witnesses:
W. CLYDE JONES,
M. R. ROCHFORD.